United States Patent [19]

Verde

[11] 3,952,671

[45] Apr. 27, 1976

[54] UNIVERSAL CROSSBAR HEAD FOR ENGAGING BELTRAILS

[75] Inventor: Emanuel Val Verde, Chicago, Ill.

[73] Assignee: Transco Inc., Chicago, Ill.

[22] Filed: Feb. 5, 1975

[21] Appl. No.: 547,102

[52] U.S. Cl. .............................. 105/498; 105/501
[51] Int. Cl.² ..................... B60P 7/08; B60P 7/16; B61D 45/00; B61D 49/00
[58] Field of Search .......... 105/497, 498, 499, 500, 105/501, 502, 503, 504

[56] References Cited
UNITED STATES PATENTS

| | | | |
|---|---|---|---|
| 2,725,826 | 12/1955 | Tobin et al. | 105/502 X |
| 2,769,404 | 11/1956 | Dietrichson | 105/499 |
| 3,130,690 | 4/1964 | Johnston | 105/498 |
| 3,227,102 | 1/1966 | Shook | 105/499 |
| 3,534,692 | 10/1970 | Verde | 105/500 |
| 3,721,200 | 3/1973 | Schmidt | 105/499 |
| 3,782,295 | 1/1974 | Balinksi | 105/502 |
| 3,799,070 | 3/1974 | Munson | 105/501 |
| R26,309 | 11/1967 | Heard | 105/499 |

*Primary Examiner*—Albert J. Makay
*Assistant Examiner*—Howard Beltran
*Attorney, Agent, or Firm*—Edward C. Threedy

[57] ABSTRACT

A head structure for a crossbar useful in positioning and restraining freight in movable vehicles. The head structure provides a plurality of independent yet interrelated spring biased locking members selectively used with a variety of different configurations of belt rails positioned along opposite sides of the vehicle for positioning and restraining freight therein.

8 Claims, 6 Drawing Figures

UNIVERSAL CROSSBAR HEAD FOR ENGAGING BELTRAILS

SUMMARY OF THE INVENTION

A crossbar used in conjunction with belt rails positioned along opposite sides of a freight car for positioning and restraining freight within the vehicle. Each crossbar includes at the opposite ends thereof head structures that provide locking engagement with the belt rails. However, there are presently in use belt rail systems wherein the rails have varying configurations primarily designed to accommodate only one particular locking head structure. The present invention provides a universal type head structure having utility with all known types of belt rails.

To accomplish the objects of providing a universal locking head, the present structure includes a pair of stationary hook-shaped members projecting outwardly and downwardly from the front wall of the head. A slidable latch pin is adapted to project outwardly of the front wall of the head. Between the hook-shaped members and beneath the latch pin, are a set of locking fingers and a set of restraining pins, the latter two elements having independent and interrelated retracting movement relative to their normal outwardly projected condition. Through the interplay of retracting or projecting the latch pin, the locking fingers, and the restraining pins, with respect to the stationary hook-shaped members, the head structure may be removably attached to belt rail systems having various configurations, all of which are well known in the art.

GENERAL DESCRIPTION

The objects of providing a universal crossbar head are achieved through the particular embodiment as shown in the accompanying drawings, wherein.

Figure 1:
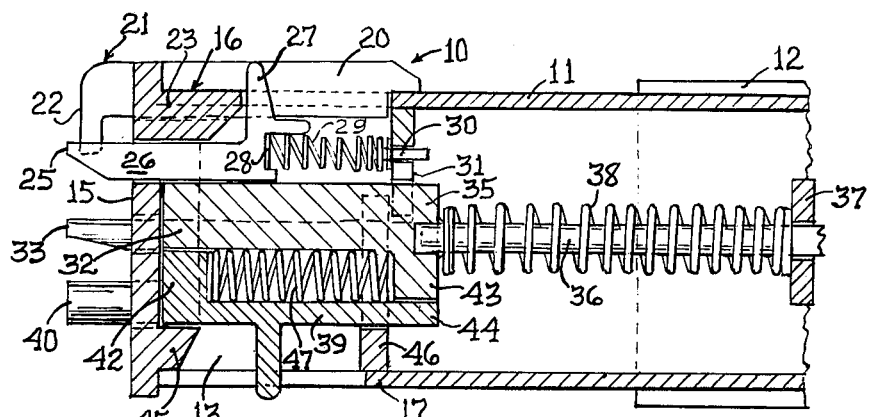
FIG. 1 is a fragmentary detailed sectional view of a universal locking head of the present invention.

As best shown in FIG. 1, the connecting head structure 10 includes a tubular sleeve 11 adapted to be projected into the normal open end of the crossbar 12. The head structure 10 may be formed from a steel casting or forging and, as such, provides side walls 13 and 14, a front wall 15, and a partially open top wall 16 and bottom wall 17.

Figure 2:
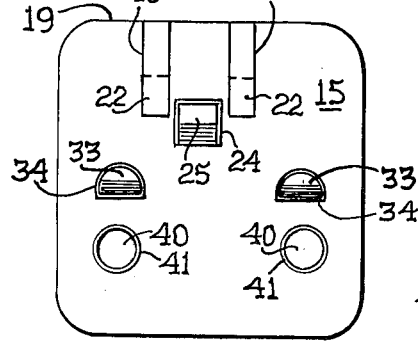
FIG. 2 is a front facial view of the universal locking head.

The front wall 15 provides a pair of elongated slots 18 (FIG. 2) opening from the top edge 19, each of which receives a portion of the longitudinal bodies 20 of retaining members 21. The free ends of the retaining members 21 project forwardly of the face of the front wall 15 and terminate into downwardly projecting hooked ends 22.

As seen in FIG. 1, the elongated body portion 20 together with a partial shelf 23 extending rearwardly from the front wall 15, form the partially open top wall 16.

Figure 4:
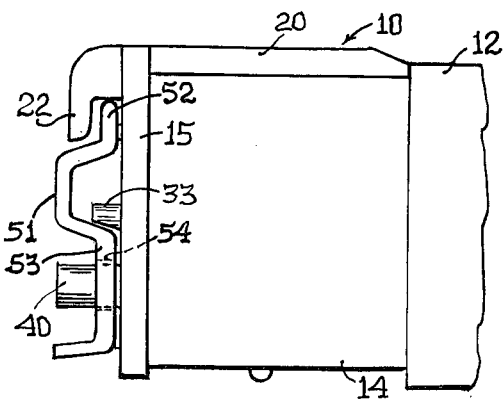
Figure 5:
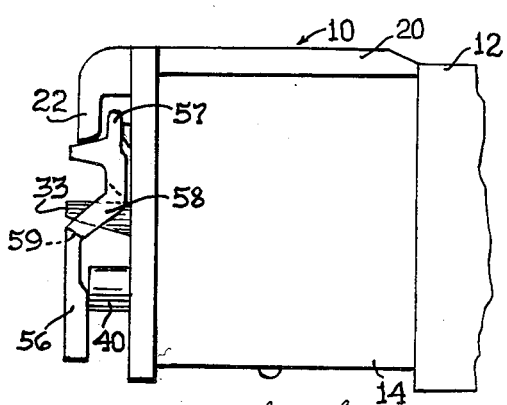
Figure 6:
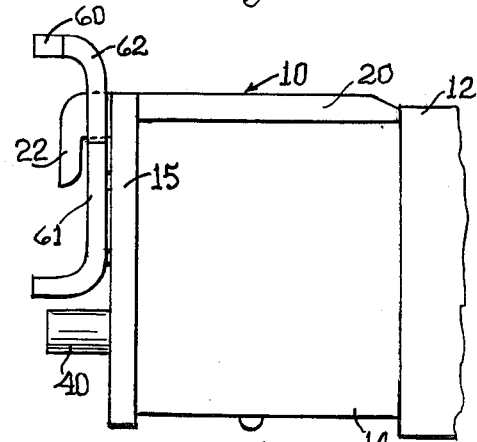

Formed in the fron wall 15 between and slightly beneath the hooked ends 22 of the retaining members 21, is a rectangularly shaped opening 24. Slidably projected through the opening 24 is the free end 25 of a locking pin 26. The locking pin 26 provides an upwardly protruding finger grip 27 exposed through the open top wall 16 between the elongated bodies 20 of the retaining members 21. The rear of the locking pin 26 provides a pocket 28 in which sits one end of a coiled expansion spring 29. The opposite end of the expansion spring 29 embraces a post 30 projecting outwardly from a partial rear wall 31. The spring 29 through the expansion of its coils normally urges the free end 25 of the locking pin 26 out of the opening 24, as shown, while permitting the pin 26 to be manually retracted within the head structure, as shown in FIGS. 4, 5 and 6, for the purposes hereinafter set forth.

Within the head structure 10 is a block generally rectangular in shape, identified at 32. Upon the top edge of the block 32 slidably rests a locking pin 26. The block 32 provides a pair of locking fingers 33 normally projecting out of openings 34 formed in front wall 15 beneath and to either side of the hooked ends 22 of the retaining members 21.

The face of the rear wall 35 of the block 32 is recessed to as to form a well into which projects one end of a pusher rod 36. This rod 36 extends rearwardly from the block 32 and is freely journalled through a bracket 37 provided by the crossbar 12. Placed between the rear wall 35 of the block 32 and the bracket 37 and embracing the rod 36 is an expansion spring 38. This spring 38 functions to normally yieldably project the block 32 in the direction of the front wall 15, with the locking fingers 33 thereof protruding out of the openings 34, as shown in FIG. 1.

The expansion spring 28 has a second function, and that is to cause the expulsion of the tubular sleeve 11 and the head structure 10 longitudinally from the crossbar 12 so as to maintain pressure of the front wall 15 against the respective belt rails Beneath the block 32 within the head structure 10, is a manipulatable restraining member 39. This restraining member 39 provides a pair of restraining pins 40 journalled through openings 41 formed in the front wall 15 directly below the openings 34 out of which project the locking fingers 33.

The restraining member 39 has a front shoulder 42 positioned behind the front wall 15 and upon which rests a portion of the block 32. As shown in FIG. 1, the block 32 provides at its innermost end a depending shoulder 43 that in turn sits upon the innermost tail portion 44 of the restraining member 39.

The front wall 15 provides an abutment 45 for supporting the front portion of the restraining member 39, while a partial wall 46 extending between the side walls of the head structure 10 supports the innermost tail portion 44 of the restraining member 39.

When the block 32 and the restraining member 39 are positioned within the head 10, a chamber is formed between the shoulder 42 and the restraining member 39 and the depending shoulder 43 of the block 32. Within the chamber is an expansion spring 47, the force of which is less than that of the expansion spring 38 bearing upon the block 32, such that the spring 47 yieldably places the restraining member 39 in the position shown in FIG. 1.

From the foregoing, it is apparent that the head structure 10 provides a variety of retaining and restraining members by which the head structure may be attached to belt rails having varying configurations.

Figure 3:
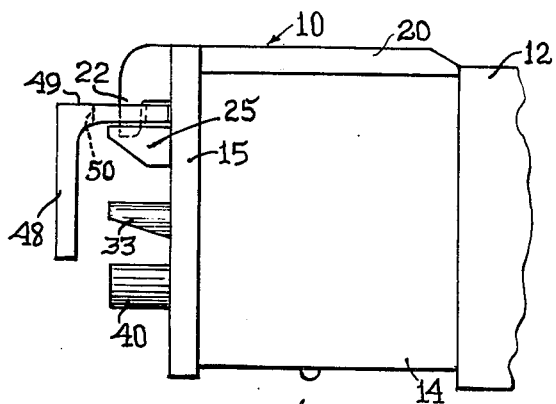
FIGS. 3, 4, 5 and 6 are fragmentary side elevational views showing the universal crossbar head attached to belt rails of varying configurations.

For example, FIG. 3 depicts how the universal head structure of the invention is readily attached to an angular shaped belt rail 48. As such, the angle-shaped belt rail 48 provides a horizontal leg 49 having a downwardly directed opening 50 formed therein.

To mount the head 10 onto the belt rail 48 the operator through the finger grip 27 will retract the locking pin 26 into the head structure 10 while permitting the hooked ends 22 of the retaining members 21 to be projected into the opening 50 formed in the leg 49 of the belt rail 48. Upon release of the finger grip 27, the spring 29 will project the latch pin 26 such that its free end 25 will project beneath the leg 49. In such position the crossbar 12 is restrained from longitudinal movement along the belt rail 48 by reason of having the hooked shaped ends 22 of the retaining members 21 projected into the opening 50 of the belt rail 48 and with the head 10 locked against vertical movement in either direction with respect to the belt rail 48 by reason of the latch pin 26 being positioned beneath the leg 49 of the belt rail 48.

When the universal head of the present invention is utilized with a belt rail 51 having the configuration shown in FIG. 4, wherein the belt rail provides a raised lip 52 as well as a laterally projecting boss 53, which in turn provides a horizontally directed opening 54 therethrough, with such a configuration the operator will retract not only the locking pin 26 through the use of the finger grip 27, but will also retract the restraining member 39 through the facility of a finger grip 55 which projects outwardly of the partial bottom wall 17 of the head structure 10, as shown in FIG. 1.

With both the locking pin 26 and the restraining member 39 in their retracted position, the hook-shaped ends 22 of the retaining members 21 may be projected over the tip 52 of the belt rail 51. Upon release of the latch pin 26, it will project outwardly of the front wall 15 of the head structure until it engages the lip 52 where it will be restrained in a non-active position. Upon release of the restraining member 39, the restraining pins 40 thereof will project into and through the opening 54 formed in the raised boss 53 of the belt rail 51. The locking fingers 33 will, if necessary, be forced inwardly of the head structure 10 against the expansion spring 38 as shown in FIG. 4, where they will assume an inactive position.

By this arrangement the hooked ends 22 of the retaining members 21 are projected behind the lip 52 so as to prevent separation of the head 10 from the belt rail 51, while the restraining pins 40 projected into the openings 54 provided by the belt rail 51 will prevent vertical as well as horizontal and longitudinal movement of the head 10 relative to such belt rail.

In FIG. 5 there is shown a further modification of a belt rail 56 which includes a raised tip portion 57 and an intermediate angled body portion 58 which has an opening 59 formed therethrough. To connect the head structure 10 to the belt rail 56, the locking pin 26 is again retracted, as hereinbefore noted, so that the hooked ends 22 of the retaining members 21 may be placed behind the tip 57 of the belt rail 56. The locking fingers 33 carried by the block 32 will be permitted to project into the opening 59 formed in the angled body portion 58 of the belt rail 56, while the restraining pins 40 will assume a non-active position.

In such arrangement, the hooked ends 22 of the retaining members 21 prevent horizontal movement of the crossbar 12 away from the belt rail 56, while the locking fingers 33 prevent vertical or longitudinal movement of the crossbar 12 relative to the belt rail 56.

A further modified belt rail 60 is shown in FIG. 6, which includes a generally U-shaped member having formed in the base portion 61 thereof a horizontally directed opening 62. To connect the universal head structure 10 to the belt rail 60, it is necessary that the latch pin 26 be retracted, as hereinbefore noted. The head structure 10 is forced longitudinally against the base portion 61 of the belt rail 60 such that the locking fingers 33 are forced inwardly of the head structure 10 against their spring 38, while the hooked ends 22 of the retaining members 21 are projected into and dropped behind the opening 62 provided in the belt rail 60. The restraining pins 40 will normally project beneath the belt rail 60 as shown, and prevent vertical movement of the head relative to such belt rail, while the retaining members 21 prevent longitudinal movement of the head 10 relative to the belt rail 60 and their hooked ends 22 prevent separation of the head 10 from the belt rail 60.

While in the foregoing there has been provided a detailed description of particular embodiments of the present invention, it is to be understood that all equivalents obvious to those having skill in the art are to be included within the scope of the invention as claimed.

Having thus described my invention, what I claim as new and desire to protect by Letters Patent is:

1. A universal head structure for a crossbar of a freight-retaining system including belt rails mounted on opposite side walls of a load-carrying chamber having various different configurations requiring different connections between the head structure and the belt rails, wherein the improvement comprises
   a. a hollow housing adapted to be connected to the end of an elongated crossbar,
   b. said housing providing a substantially flat front wall extending perpendicularly to the longitudinal plane of the crossbar,
   c. a pair of fixed hook members carried by said housing projecting frontwardly and downwardly from said front wall,
   d. a first means slidably mounted in said housing and providing a portion movable through an opening in said front wall so as to cooperate with said hook members to releasably connect the crossbar to a belt rail providing a horizontal flange having vertically directed openings formed therein,
   e. a second means slidably mounted in said housing providing a pair of locking fingers movable through openings in said front wall in a plane parallel to said first means beneath and outwardly of said hook members so as to cooperate independently of said first means with said hook members to releasably connect said crossbar to a belt rail having a raised retaining lip and a spaced angularly directed opening,
   f. and a third means slidably mounted in said housing providing a pair of retaining pins movable through openings formed in said front wall in a spaced parallel plane with respect to said locking fingers of said second means so as to cooperate independently of said first and second means with said hook members to releasably connect the crossbar to a belt rail providing a substantially horizontally directed opening.

2. A universal head structure as defined by claim 1 including means provided by said first and third means for manually moving said first and third means in one direction independently of each other and of said second means.

3. A universal head structure as defined by claim 2 wherein said means provided by said first and third means for manually moving said first and third means in one direction independently of each other and said second means comprises finger grip portions exposed through the top and bottom wall of said housing.

4. A universal head structure as defined by claim 1 wherein said portion of said first means movable through said opening in said front wall comprises an elongated latch pin having one end movable through said opening formed in said front wall in a plane transverse to and between said downwardly projecting hook members.

5. A universal head structure as defined by claim 4 including means provided by said first and third means for manually moving said first and third means in one direction independently of each other and of said second means.

6. A universal head structure as defined by claim 4 and including spring members expandable against said first and second and third means to independently project said latch pin, said locking fingers, and said restraining pins, respectively, of said first, second, and third means, beyond said front wall of said housing.

7. A universal head structure as defined by claim 6 including means provided by said first and third means for manually moving said first and third means in one direction independently of each other and of said second means.

8. A universal head structure as defined by claim 7 wherein said means provided by said first and third means for manually moving said first and third means in one direction independently of each other and said second means comprises hand grip portions exposed through the top and bottom wall of said housing whereby said first and third means may be moved in one direction against their spring members so as to independently move said latch pin and said restraining pins respectively in one direction through the openings in said front wall.

* * * * *